(12) United States Patent
Lee

(10) Patent No.: US 8,237,796 B2
(45) Date of Patent: Aug. 7, 2012

(54) MONITOR FOR AUTOMOBILE

(75) Inventor: Chun-Yu Lee, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/159,560

(22) Filed: Jun. 14, 2011

(65) Prior Publication Data

US 2011/0234806 A1 Sep. 29, 2011

Related U.S. Application Data

(62) Division of application No. 11/309,259, filed on Jul. 20, 2006, now abandoned.

(30) Foreign Application Priority Data

Nov. 10, 2005 (CN) .......................... 2005 1 0101203

(51) Int. Cl.
*H04N 7/18* (2006.01)
*H01L 27/00* (2006.01)

(52) U.S. Cl. ..................................... 348/148; 250/208.1

(58) Field of Classification Search .................. 348/148; 250/208.1

See application file for complete search history.

(56) References Cited

U.S. PATENT DOCUMENTS

| 4,345,274 | A | * | 8/1982 | Bambara ........................ 348/148 |
| 5,260,564 | A | * | 11/1993 | Bruggeling et al. ........ 250/223 R |
| 6,657,176 | B2 | * | 12/2003 | Mishima et al. ............. 250/208.1 |
| 6,667,720 | B1 | * | 12/2003 | Anderton ....................... 343/761 |

* cited by examiner

*Primary Examiner* — Jay Patel
*Assistant Examiner* — Richard Torrente
(74) *Attorney, Agent, or Firm* — Altis Law Group, Inc.

(57) ABSTRACT

A monitor used in an automobile includes an image sensing module, a visual field adjustor, and a display. The image sensing module includes a lens module and an image sensor secured on an emitting light path of the lens module. The visual field adjustor includes a prism made from transparent materials and movably installed in an incident light path of the lens module. When the automobile reverses, the image sensing module cooperates with the visual field adjustor to capture optical image signals, and the display uses the optical image signals to create an image and displays the image.

9 Claims, 5 Drawing Sheets

MONITOR FOR AUTOMOBILE

CROSS-REFERENCE TO RELATED APPLICATION

This application is a divisional application of U.S. Ser. No. 11/309,259, filed on Jul. 20, 2006.

BACKGROUND

1. Technical Field

The present disclosure generally relates to monitors, and more particularly relates to a monitor that has a large visual field.

2. Description of Related Art

Nowadays automobiles are often provided with a monitor secured in the tail end to cover the blind spots of their rear-view mirrors. Generally, the visual angle of the monitor is designed to be about 60 degrees. Because the monitor is secured in the automobile, this visual angle is usually too limited to allow for the safe driving of the automobile. For example, when the automobile is reversing, a driver can only see objects in a range covering a visual angle of about 30 degrees to left and right in which the automobile is reversing, thus increasing the possibility of an accident. Monitors provided with a visual angle of more than 60 degrees can be used to extend the visual field of the driver, but these monitors require expensive optical components such as components with high refractive index or low dispersive power, thus these monitors tend to be more complicated and more expensive.

What is needed, therefore, is a simple and inexpensive monitor having a large visual field to overcome above-described problems.

BRIEF DESCRIPTION OF THE DRAWINGS

Many aspects of the monitor can be better understood with reference to the following drawings. The components in the drawings are not necessarily drawn to scale, the emphasis instead being placed upon clearly illustrating the principles of the present monitor. Moreover, in the drawings, like reference numerals designate corresponding parts through-out the several views.

DETAILED DESCRIPTION

Figure 1:
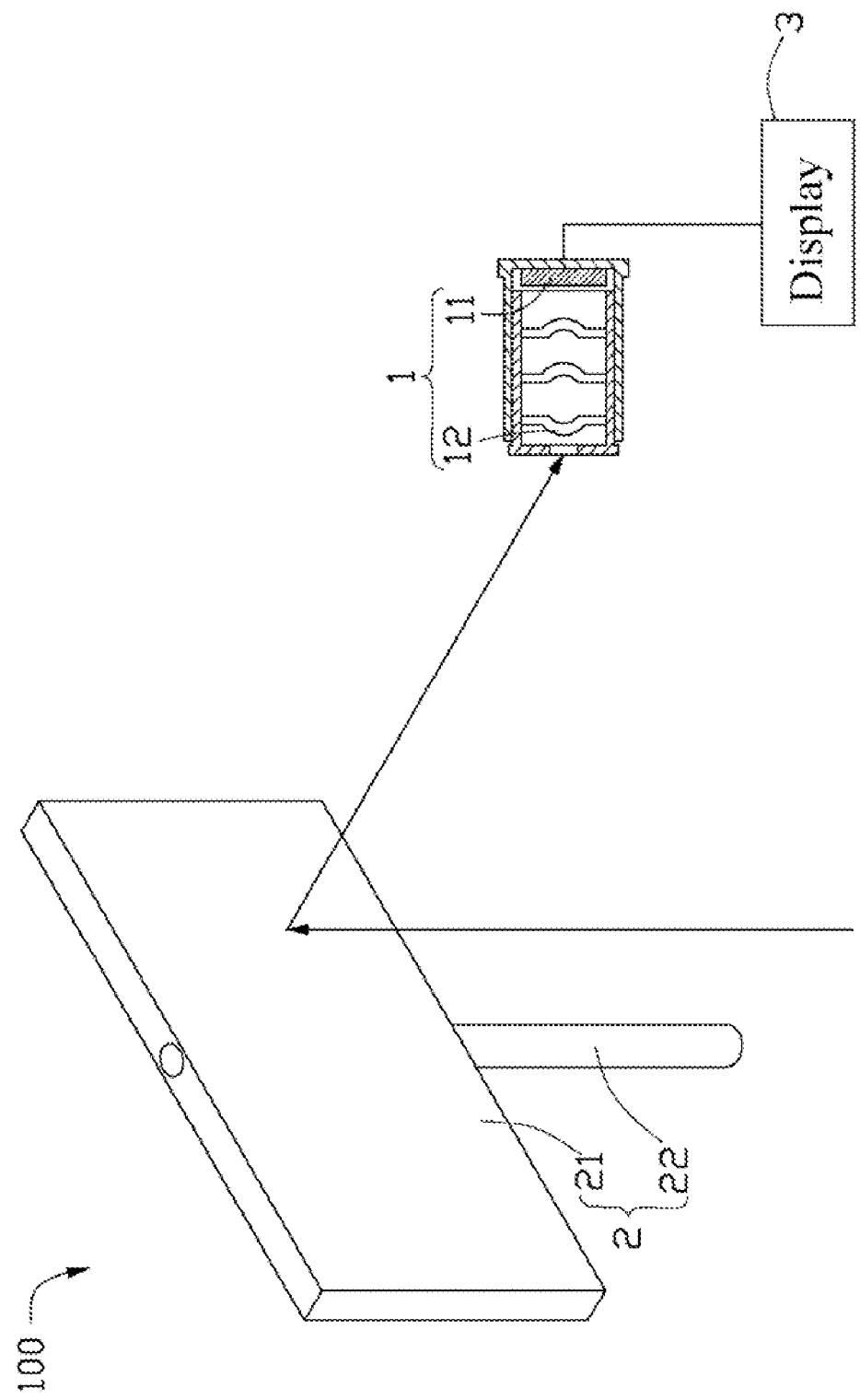
FIG. 1 is a schematic view of a monitor in accordance with a first embodiment of the present disclosure.

Referring now to the drawings, FIG. 1 shows a monitor 100 used in an automobile (not shown) according to a first embodiment of the present disclosure. Additionally, the monitor 100 can be used in other vehicles and also in fixed installations. The monitor 100 includes an image sensing module 10, a visual field adjustor 20 and a display 30. The image sensing module 10 is installed in the automobile for receiving optical image signals. An optical axis of the image sensing module 10 points to the rear of the automobile. The visual field adjustor 20 is installed on an incident light path of the image sensing module 10 to adjust the visual field of the monitor 100. The display 30 is electronically connected with the image sensing module 10 and is mounted to the automobile for processing and displaying image signals received by the image sensing module 10 to a driver of the automobile.

The image sensing module 10 includes an image sensor 11 and a lens module 12. The image sensor 11 is a charge coupled device (CCD) image sensor or a complementary metal oxide semiconductor (CMOS) image sensor. The image sensor 11 is secured on an emitting light path of the lens module 12 and electronically connected with the display 30. Optical image signals received by the lens module 12 and arriving at the image sensor 11 are transformed into electronic image signals by the image sensor 11. The electronic image signals are transferred to the display 30 to be displayed. The lens module 12 is installed in the automobile and has a visual angle of 60 degrees.

Figure 2:
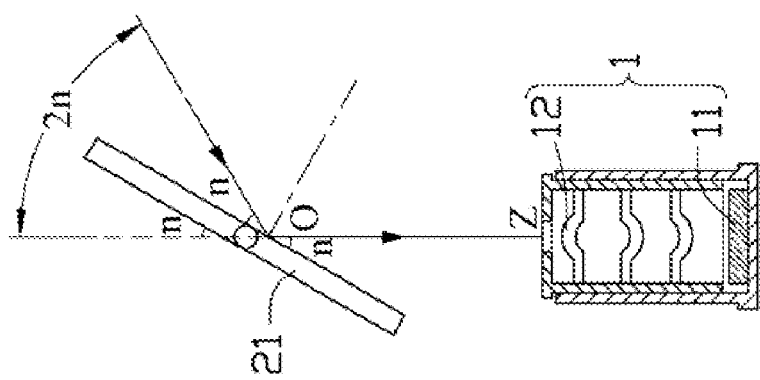
FIG. 2 is a schematic view of the monitor receiving an optical image signal with an inclination angle to an optical axis of an image sensing module shown in FIG. 1.

Also referring to FIG. 2, the visual field adjustor 20 includes a mirror 21 and an axis 22. The mirror 21 is a thin planar mirror that includes two parallel reflectors (not labeled). The mirror 21 is rotatably installed on an incident light path of the lens module 12, and optical image signals reflected by the mirror 21 are received by the lens module 12. One end of the axis 22 is secured on the midpoint of one side of the mirror 21. The other end of the axis 22 is driven by a motor (not shown) installed in the automobile to rotate, thus the mirror 21 is also driven to rotate. The speed of the rotation of the axis 22 and the mirror 21 is at least 50 revolutions per second. In other words, a cycle of rotation of the axis 22 and the mirror 21 is equal to or less than 0.02 seconds.

According to the laws of reflection, if the mirror 21 and the optical axis (the line OZ shown as FIG. 2) of the image sensing module 10 form an angle of n degrees, an optical image signal with an inclination angle of 2n degrees to an optical axis of the image sensing module 10 is reflected to travel along the optical axis and received by the image sensor 11. Therefore rotating the mirror 21 through an angle of n degrees results in an effect equal to rotating the image sensing module 10 through an angle of 2n degrees. In this way, if the mirror 21 is rotated through an angle of n degrees from a place where the mirror 21 and the optical axis of the image sensing module 10 form an angle of 0 degrees, the visual field of the monitor 100 is correspondingly rotated through an angle of 2n degrees. Because the lens module 12 has a visual angle of 60 degrees, it receives optical image signals in a range covering a visual angle of 30 degrees to left or right according to the direction in which the automobile is reversing. If the mirror 21 is rotated through an angle of 30 degrees from the place where the mirror 21 and the optical axis form an angle of 0 degrees, the visual field of the monitor 100 is correspondingly rotated through an angle of 60 degrees, thus the visual field of the monitor 100 covers a visual angle of 30 to 90 degrees according to the direction in which the automobile is reversing.

Figure 3:
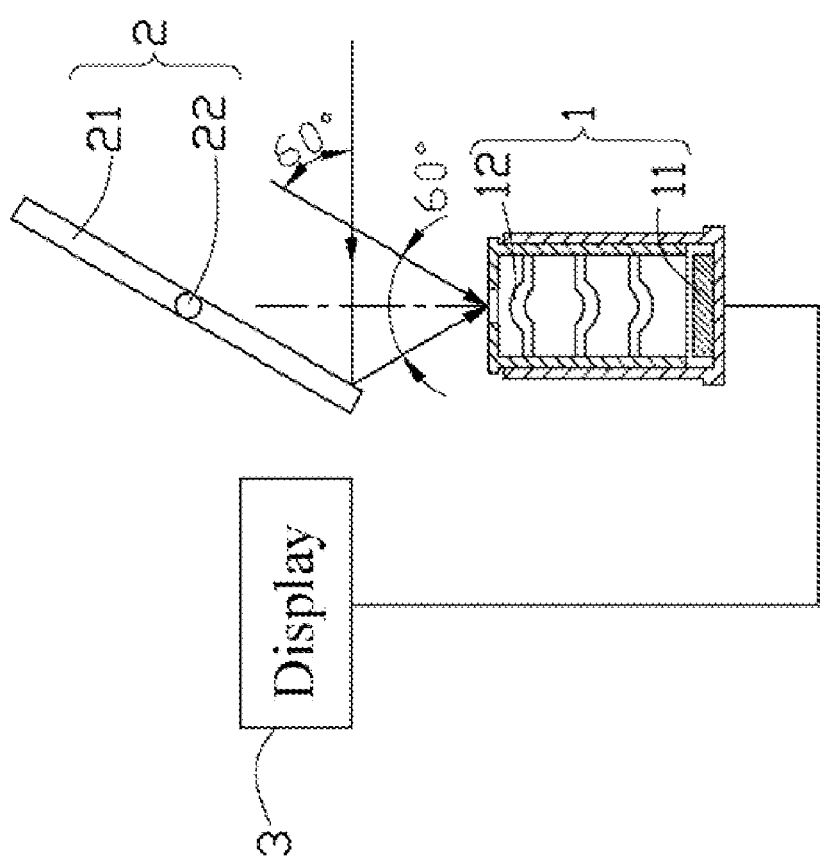
FIG. 3 is a schematic view of the monitor in a state of use shown in FIG. 1.

Referring to FIG. 3, when using of the monitor 100, the motor drives the mirror 21 to rotate. When the mirror 21 rotates to a first place where the mirror 21 and the optical axis of the image sensing module 10 form an angle of 30 degrees in one side, optical image signals in a range covering a visual angle of 30 to 90 degrees to one side according to the direction in which the automobile is reversing are reflected into the visual field of the lens module 12 by the mirror 21. When the mirror 21 rotates from the first place to a second place where the mirror 21 and the optical axis form an angle of 0 degrees, the mirror 21 can not shield the lens module 12 because it is very thin, thus the lens module 12 receives optical image signals in a range covering a visual angle of 30 degrees in left or right according to the direction in which the automobile is reversing. When the mirror 21 rotates to a third place where the mirror 21 and the optical axis form an angle of 30 degrees in another side, optical image signals in a range covering a visual angle of 30 to 90 degrees in another side according to the direction in which the automobile is reversing are reflected into the visual field of the lens module 12 by the mirror 21.

The optical image signals coming from above three positions all covering a visual angle of 60 degrees are received by the lens module 12, and arrive at the image sensor 11. The image sensor 11 transforms the optical image signals into electronic image signals and transfers the electronic image signals to the display 30. The display 30 transforms the electronic image signals into a panoramic image covering a visual angle of 180 degrees behind the automobile. As the rotation cycle of the mirror 21 is not more than 0.02 seconds, i.e. less than the time of visual persistence. Before a panoramic image disappears displayed on the display 30 in the driver's eyes, it is replaced by another panoramic image that comes from the optical image signals received by the lens module 12 after the mirror 21 rotates. In this way, changing of the panoramic images caused by rotating the mirror 21 can-not be sensed by the driver's eyes. Therefore the driver sees that the panoramic images covering a visual angle of 180 degrees behind the automobile are continuously displayed on the display 30.

Figure 4:
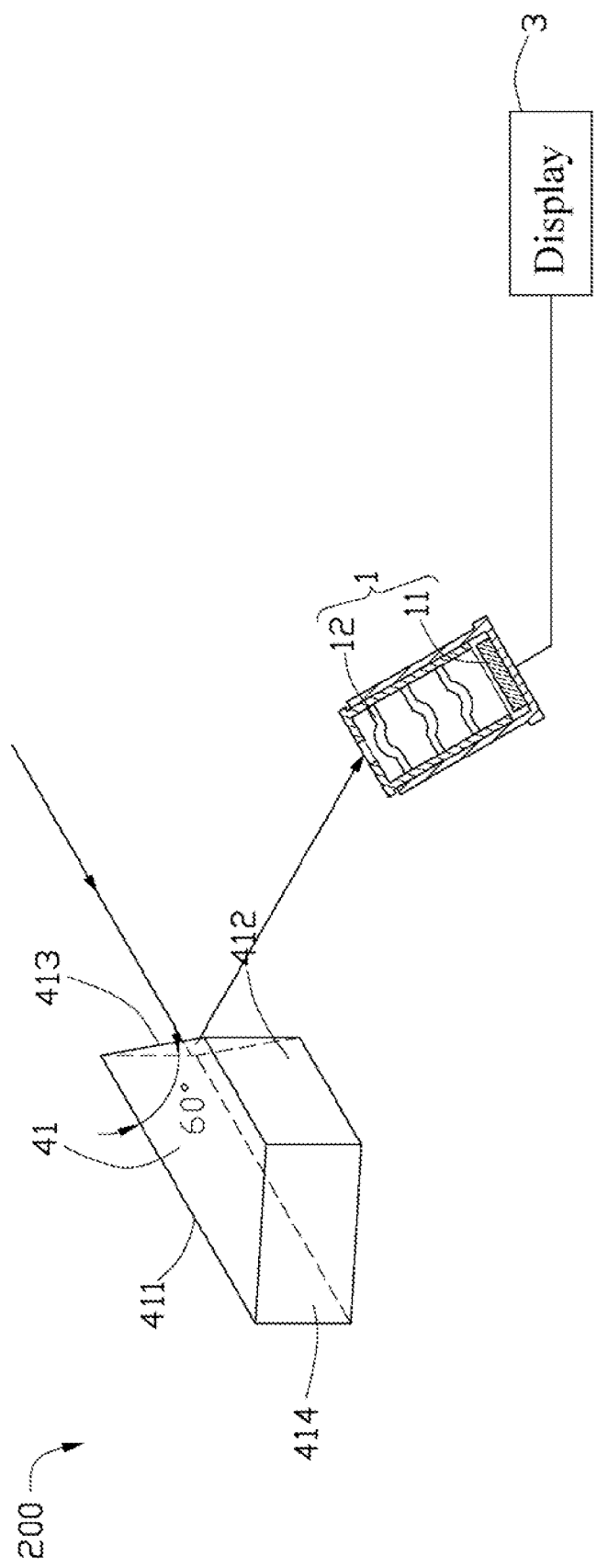
FIG. 4 is a schematic view of a monitor in accordance with a second embodiment of the present disclosure.
Figure 5:
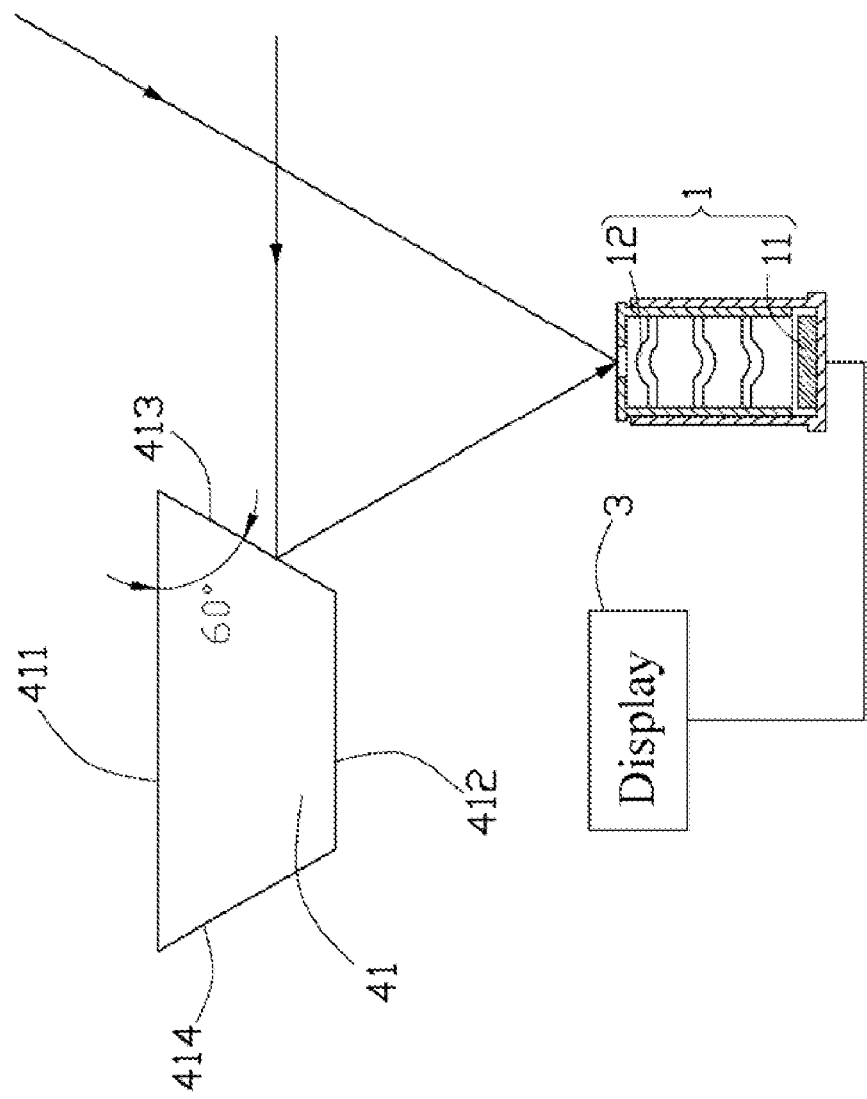
FIG. 5 is a schematic view of the monitor shown in FIG. 4 in use.

Referring FIG. 4 and FIG. 5, a monitor 200 according to a second embodiment is provided. All components of the monitor 200 are similar to the monitor 100 except that a prism 41 replaces the mirror 21 of the monitor 100. The prism 41 is movably installed in the incident light path of the lens module 12. The prism 41 is made from transparent materials such as glass and includes a trapeziform bottom (not labeled), a first side 411, a second side 412, a third side 413 and a fourth side 414. The first side 411 is parallel to the second side 412 and the area of the first side 411 is larger than the area of the second side 412. The third side 413 and the fourth side 414 both intersect with the first side 411 and the second side 412. The third side 413 and the fourth side 414 both form an angle of 60 degrees to the first side 411. Two reflectors (not shown) are respectively installed on the third side 413 and the fourth side 414. The second side 412 is located between the first side 411 and the lens module 12. The prism 41 is driven by a motor (not shown) installed in the automobile to move back and forth. A cycle of moving the prism 41 is equal to or less than 0.02 seconds.

In use of the monitor 200, the motor is turned on to drive the prism 41 to move back and forth. When the prism 41 moves to a first place where the third side 413 is located in an incident light path of the lens module 12, optical image signals in a range covering a visual angle of 30 to 90 degrees in one side according to the direction in which the automobile is reversing are reflected into the visual field of the lens module 12 by the reflector on the third side 413. When the prism 41 moves from the first place to a second place where the second side 412 is located in the incident light path of the lens module 12, optical image signals in a range covering a visual angle of 30 degrees in left or right according to the direction in which the automobile is reversing travel through the first side 411 and the second side 412, and then the lens module 12 receives the optical image signals. When the prism 41 moves to a third place where the fourth side 414 is located in the incident light path of the lens module 12, optical image signals in a range covering a visual angle of 30 to 90 degrees in another side according to the direction in which the automobile is reversing are reflected into the visual field of the lens module 12 by the reflector on the fourth side 414.

The optical image signals coming from above three positions all covering a visual angle of 60 degrees are received by the lens module 12, and arrive at the image sensor 11. The image sensor 11 transforms the optical image signals into electronic image signals and transfers the electronic image signals to the display 30. The display 30 transforms the electronic image signals into a panoramic image covering a visual angle of 180 degrees behind the automobile. A moving cycle of the prism 41 is not more than 0.02 seconds, i.e. less than the time of visual persistence. Before a panoramic image disappears displayed on the display 30 in the eyes of the driver, it is replaced by a next panoramic image that comes from the optical image signals received by the lens module 12 after the prism 41 moves back and forth. In this way, the changes of the panoramic images caused by rotating the mirror 21 can not be sensed by the driver's eyes. Therefore the driver sees that the panoramic images covering a visual angle of 180 degrees behind the automobile are continuously displayed on the display 30.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A monitor used in an automobile, comprising:
an image sensing module secured on the automobile, the image sensing module including a lens module and an image sensor, the image sensor secured on an emitting light path of the lens module;
a visual field adjustor, the visual field adjustor including a prism and two reflectors, the prism made from transparent materials and movably installed in an incident light path of the lens module; the prism including a trapeziform bottom, a first side, a second side, a third side and a fourth side; the first side being parallel to the second side, the area of the first side being larger than the area of the second side, the third side and the fourth side both intersecting with the first side and the second side, and the third side and the fourth side both forming an angle of 60 degrees to the first side; the two reflectors respectively installed on the third side and the fourth side; and
a display electronically connected with the image sensor and mounted to the automobile; wherein when the automobile reverses, the image sensing module cooperates with the visual field adjustor to capture optical image signals, and the display uses the optical image signals to create an image and displays the image;
wherein when the prism moves to a first place where the third side is located in an incident light path of the lens module, optical image signals in a first range are reflected into the visual field of the lens module by the reflector on the third side and are received by the lens module; when the prism moves to a second place where the second side is located in the incident light path of the lens module, optical image signals in a second range travel through the first side and the second side and are received by the lens module; and when the prism moves to a third place where the fourth side is located in the incident light path of the lens module, optical image signals in a third range are reflected into the visual field of the lens module by the reflector on the fourth side and received by the lens module.

2. The monitor as claimed in claim 1, wherein a cycle of moving the prism is equal to or less than 0.02 seconds.

3. The monitor as claimed in claim 1, wherein the first range covers a visual angle of −90 to −30 degrees relative to the direction in which the automobile is reversing, the second range covers a visual angle of −30 to 30 degrees relative to the direction in which the automobile is reversing, and the third range covers a visual angle of 30 to 90 degrees relative to the direction in which the automobile is reversing.

4. The monitor as claimed in claim 1, wherein the image sensor transforms the optical image signals received from the first range, the second range, and the third range by the lens module into electronic image signals and transfers the electronic image signals to the display, and the display uses these electronic image signals to create an image covering a visual field behind the automobile and displays the image.

5. A monitor used in an automobile, comprising:
   an image sensing module for receiving image signals, the image sensing module including a lens module and an image sensor, the image sensor secured on an emitting light path of the lens module;
   a visual field adjustor adjusting the visual field of the monitor, the visual field adjustor includes a prism and two reflectors, the prism made from transparent materials and movably installed in the incident light path of the lens module; the prism including a trapeziform bottom, a first side, a second side, a third side and a fourth side; the first side being parallel to the second side, the area of the first side being larger than the area of the second side, the third side and the fourth side both intersecting with the first side and the second side, and the third side and the fourth side both forming an angle of 60 degrees with the first side; the two reflectors respectively installed on the third side and the fourth side; and
   a display electronically connected with the image sensor;
   wherein when the automobile reverses, the image sensing module cooperates with the visual field adjustor to capture optical image signals, and the display processing and displaying the optical image signals received by the image sensing module and the visual field adjustor;
   wherein when the prism moves to a first place where the third side is located in an incident light path of the lens module, optical image signals in a first range are reflected into the visual field of the lens module by the reflector on the third side and are received by the lens module; when the prism moves to a second place where the second side is located in the incident light path of the lens module, optical image signals in a second range travel through the first side and the second side and are received by the lens module; and when the prism moves to a third place where the fourth side is located in the incident light path of the lens module, optical image signals in a third range are reflected into the visual field of the lens module by the reflector on the fourth side and received by the lens module.

6. The monitor as claimed in claim 5, wherein a cycle of moving the prism is equal to or less than 0.02 seconds.

7. The monitor as claimed in claim 5, wherein the first range covers a visual angle of −90 to −30 degrees relative to the direction in which the automobile is reversing, the second range covers a visual angle of −30 to 30 degrees relative to the direction in which the automobile is reversing, and the third range covers a visual angle of 30 to 90 degrees relative to the direction in which the automobile is reversing.

8. The monitor as claimed in claim 5, wherein the image sensor transforms the optical image signals received from the first range, the second range, and the third range by the lens module into electronic image signals and transfers the electronic image signals to the display, and the display uses these electronic image signals to create an image covering a visual field behind the automobile and displays the image.

9. A monitor used in an automobile, comprising:
   a visual field adjustor having a reflective surface for reflecting image light; the visual field adjustor including a prism and two reflectors; the prism made of transparent materials and including a trapeziform bottom, a first side, a second side, a third side and a fourth side; the first side being parallel to the second side, the area of the first side being larger than the area of the second side, the third side and the fourth side both intersecting with the first side and the second side, and the third side and the fourth side both forming an angle of 60 degrees with the first side; the two reflectors respectively installed on the third side and the fourth side;
   an image sensing module configured for receiving the image light and output an image signal associated with the image light; and
   a display electrically connected with the image sensing module for displaying the image output from the image sensing module;
   wherein when the prism moves to a first place where the third side is located in an incident light path of the image sensing module, optical image signals in a first range are reflected into the visual field of the image sensing module by the reflector on the third side and are received by the image sensing module; when the prism moves to a second place where the second side is located in the incident light path of the image sensing module, optical image signals in a second range travel through the first side and the second side and are received by the image sensing module; and when the prism moves to a third place where the fourth side is located in the incident light path of the image sensing module, optical image signals in a third range are reflected into the visual field of the image sensing module by the reflector on the fourth side and received by the image sensing module.

* * * * *